Patented May 14, 1946

2,400,409

UNITED STATES PATENT OFFICE 2,400,409

METHODS FOR DEHYDRATION OF ALCOHOLS

William J. Hale, Midland, Mich., and Harry Miller, Columbia, Mo., assignors, by direct and mesne assignments, to National Agrol Company, Inc., Washington, D. C., a corporation of Delaware No Drawing. Application September 5, 1942, Serial No. 457,478

10 Claims. (Cl. 260—681)

This invention relates to methods for the dehydration of alcohols, and more particularly to methods for carrying out such dehydration efficiently.

This application is a continuation-in-part of our copending application Serial No. 451,320, filed July 17, 1942.

Among the objects of this invention may be noted the provision of methods for dehydrating alcohols; the provision of methods for dehydrating alcohols in a way which minimizes the formation of undesired by-products; the provision of methods for dehydrating polyhydric alcohols having adjacent hydroxyl groups; and the provision of methods of the type indicated which afford an improved yield of desired products and substantially eliminate the formation of undesired by-products. Other objects will be in part apparent and in part pointed out hereinafter.

The invention accordingly comprises the steps and sequence of steps, and features of synthesis, analysis, or metathesis, which will be exemplified in the processes hereinafter described, and the scope of the application of which will be indicated in the following claims.

In application Serial No. 451,320 a catalyst is disclosed which has an improved dehydrative activity. This catalyst comprises certain oxides of elements of the sixth group of the periodic system which just prior to their activation by hydrogen, have been stabilized by combination with certain acidic compounds. These compounds, non-reducible by hydrogen, reduce to a minimum any tendency for the activated oxides to lose all of their oxygen. The intermediate position of the activated oxide group between the basic metal employed and the irreducible acidic oxides is an important factor in obtaining this result.

Likewise as shown in Serial No. 451,320 the presence of certain inert gases such as nitrogen has proved generally unsatisfactory, while the presence of others such as methane, carbon dioxide and ammonia are of advantage in carrying out the dehydration.

In accordance with the present invention, it has been found that the use of ammonia derivatives such as alkyl or aryl amines in lieu of ammonia or the other inert gases provides an improved control of the dehydration step. The preferred amines have a pH lying between 8 and 9 on the scale. The pH of the reaction medium may be conveniently determined with the usual electrode measuring equipment, the pH being taken of the mixture before vaporization.

Among the ammonia derivatives serviceable in this invention may be mentioned the simple alkyl amines such as methyl and ethyl amines; the aryl amines or anilines; the cycloimines as pyrroles, pyridines and reduction products, pyrrolidines and piperidines; the alkylene diamines as ethylene diamines and the like; the alkylene and alkylidene imines and di-imines such as piperazines; the aminoamines, such as hydrazine (diamide) and derivatives; and even tetramines such as hexamethylene tetramine; and related products of the ammonia type.

Alkyl and aryl amines in general are most suitable. The amine selected should have a boiling point sufficiently low to avoid all possibility of carbon deposition within the catalyst mass. Mixed amines and imines and mixtures of the various amines and imines may be likewise employed.

In the dehydration of dihydric alcohols in which the hydroxyl groups are on adjacent carbon atoms, for example, 2,3-butylene glycol, it has been noted that often times amounts of undesirable by-products are obtained. As is pointed out in our earlier application Serial No. 451,320, methyl ethyl ketone is particularly difficult to avoid.

It has been found, in accordance with the present invention, that the dehydration of 2,3-butylene glycol to butadiene is favored by the presence of the amines referred to and to such an extent that the formation of methyl ethyl ketone is substantially decreased.

The methyl ethyl ketone formed during the dehydration of 2,3-butylene glycol apparently arises out of the intramolecular dehydration of 2,3-butylene glycol to form an anhydride type of compound, symmetrical dimethyl ethylene oxide, which is unstable and tautomerizes into methyl ethyl ketone.

It has been found, in accordance with the present invention, that the tautomerization of the intramolecular anhydride into methyl ethyl ketone can be substantially completely prevented by the addition of a small proportion of methyl ethyl ketone to the 2,3-butylene glycol before carrying out the dehydration in accordance with the present methods.

Where the dehydration of the 2,3-butylene glycol is carried out in an alkaline atmosphere or medium, and in the presence of a small amount of water vapor, the methyl ethyl ketone formation can be thus substantially completely prevented. The dehydration then goes smoothly to form eventually butadiene and a small amount of the half-way dehydrated product—vinyl methyl carbinol. Although an ammonia atmosphere may be used, as described in our aforementioned application, the amines of the present invention are preferred. A small proportion of methyl ethyl ketone, which should be approximately the proportion present in the equilibrium ratio between symmetrical dimethyl ethylene oxide and methyl ethyl ketone under the heretofore-mentioned or ordinary dehydration conditions, is preferably employed. This equilibrium ratio is about ten parts of symmetrical dimethyl ethylene oxide to one part of methyl ethyl ketone where the reaction is carried out in an alkaline medium, as described above, at a temperature between 200 and 250° C. Therefore an addition to 2,3-butylene glycol of about 10% of its weight of methyl ethyl ketone substantially completely represses the formation of by-product methyl ethyl ketone in reactions within the temperature range stated.

An alkaline atmosphere is important in obtaining the equilibrium above referred to. The atmosphere medium should be sufficiently alkaline to cause the ketone to tautomerize itself in part, or at least to force it into an initial enolic structure. In general, the proportion of amine required is about four to five times the proportion of methyl ethyl ketone present. Likewise the pH value is of significance as pointed out above. For example, trimethyl amine which has a pH of 8.5 and triethyl amine which has a pH of 8.3 are both of particular value in carrying out the present invention. The trace of moisture from the air contained in these products suffices for ionization.

The processes of the present invention are to be contrasted with those in which the hydroxyl groups are acetylated to form the diacetate, and then a molecule of acetic acid from each acetyl group and a hydrogen atom on the adjoining carbon atom is split off to leave butadiene. This acetylation process requires the application of considerable heat which is of the order of 400° C. and higher; a temperature requisite for a cracking operation. In contradistinction, the methods of the present invention employing distinctly basic amines or imines and utilizing as a raw material the same dihydric alcohol may be viewed as contributive to formation of quaternary ammonium bases, through union of the slightly acidic secondary hydroxyl groups with the strongly basic amines at hand, and disruption under heating, of these self-repelling ammonium substituents as they come into contact with hydrogen atoms upon adjacent carbon atoms to split off water, restore the basic amine and yield butadiene.

The reaction may be carried out at temperatures in the neighborhood of 150 (under reduced pressure) to 300° C. Temperatures of 200 to 250° C. are preferred. The conditions of temperature and pressure are of course selected so as to have the dihydric alcohol in vapor phase to be passed over the dehydration catalyst. Decreasing the pressure permits decreasing the temperature of operation.

Some of the higher boiling diols, for example, 2,3-pentanediol (methyl ethyl ethylene glycol), boiling point 187° C., and 2,3-hexanediol (2,3-dihydroxy hexane), boiling point 207° C., are readily converted into the corresponding dienes, namely, 1-methyl butadiene and 1-ethyl butadiene respectively.

In the following examples the same catalyst is used throughout. It corresponds closely with that disclosed in our copending application Serial No. 451,320.

Granular aluminum of 30 mesh was brought into contact with about 1% of silicic acid and about 10% of tungstic anhydride and the whole was roasted at about 650° C. It was then heated in an atmosphere of hydrogen at approximately 500° C. for one-half hour, and was ready for use.

Example 1

About 100 g. of the catalyst as above prepared were placed in an ordinary combustion tube of about one inch internal diameter, and the approximately six inch column of catalyst brought to a temperature of 230 to 235° C. Over this catalyst were then passed vapors of acetyl methyl carbinol (36 g.) together with 10 g. of water and 10 g. of triethyl amine. There resulted 20½ g. of vinyl methyl ketone and 10 g. of unreacted carbinol. This represents a 72% conversion in one pass, covering thirty minutes.

Example 2

100 g. of the catalyst employed in Example 1 was now placed in another tube and through this tube the vapors of 25 g. of methyl vinyl carbinol, together with 5 g. of water and 10 g. of trimethyl amine were passed at a temperature of 230° C. There resulted 12½ g. of butadiene and 8½ g. of unchanged methyl vinyl carbinol. This corresponds to a 66% conversion in one pass.

Example 3

100 g. of the catalyst employed in Example 1 were now introduced into another tube and heated at 225 to 235° C. Over this catalyst 25 g. of 2,3-butylene glycol admixed with 5 g. of water and 2½ g. of methyl ethyl ketone were passed, together with 12½ g. of triethyl amine. In the course of twenty-five minutes the following result was obtained: 7.2 g. of butadiene, 5 g. of methyl vinyl carbinol, 7 g. of unacted upon glycol and 2½ g. of methyl ethyl ketone. This is a 48% conversion in one pass of 2,3-butylene glycol into butadiene with no formation of methyl ethyl ketone, and no trace of other impurities such as aldehydes.

Example 4

Example 3 was repeated in all details save that in place of the 12½ g. of triethyl amine 12½ g. of dimethyl amine were substituted. The results accorded in all respects with those given for Example 3.

Example 5

Example 3 was again repeated in all details except that for the triethyl amine there was now substituted 10 g. of pyridine as the amine. The results again were practically identical with Example 1.

The dehydration of derivatives of 2,3-butylene glycol may be carried out in an analogous way. The reaction proceeds to substantially the same degree as with 2,3-butylene glycol itself. An alkaline atmosphere is highly advantageous to such dehydration in that it inhibits tautomerization.

In view of the above, it will be seen that the several objects of the invention are achieved and other advantageous results attained.

As many changes could be made in the above processes without departing from the scope of the invention, it is intended that all matter contained in the above description shall be interpreted as illustrative and not in a limiting sense.

We claim:

1. The method of dehydrating a monohydric alcohol which comprises passing a vaporous mixture of the alcohol and a substance selected from the group consisting of amines over a dehydration catalyst at a temperature of between about 150° C. and 300° C.

2. The method of dehydrating a polyhydric alcohol which comprises passing a vaporous mixture of the alcohol and a substance selected from the group consisting of amines and imines over a dehydration catalyst at a temperature of between about 150° C. and 300° C.

3. The method of dehydrating a polyhydric alcohol having two adjacent hydroxyl groups which comprises passing a vaporous mixture of the alcohol and a substance selected from the group consisting of amines and imines over a dehydration catalyst at a temperature of between about 150° C. and 300° C.

4. The method of dehydrating 2,3-butylene glycol which comprises passing a vaporous mixture of the glycol, a substance selected from the group consisting of amines and imines and an added proportion of methyl ethyl ketone over a dehydration catalyst at a temperature of between about 150° C. and 300° C.

5. The method of dehydraing 2,3-butylene glycol which comprises passing a vaporous mixture of the glycol, a substance selected from the group consisting of amines and imines and an added proportion of methyl ethyl ketone over a dehydration catalyst, at a temperature of between about 150° C. and 300° C. said methyl ethyl ketone being present in an amount corresponding to its concentration in the equilibrium proportion.

6. The method of dehydrating alcohols which comprises passing the alcohol and at least one substance selected from the group consisting of amines and imines in vapor phase at a temperature of approximately 150 to 300° C. over a dehydration catalyst.

7. The method of dehydrating alcohols which comprises passing the alcohol and at least one substance selected from the group consisting of amines and imines in vapor phase at a temperature of approximately 200 to 250° C. over a dehydration catalyst.

8. The method of dehydrating 2,3-butylene glycol which comprises passing a vaporous mixture of the glycol, a substance selected from the group consisting of amines and imines and approximately 10% by weight of methyl ethyl ketone based on the weight of the glycol at a temperature of between about 150° C. and 300° C. over a dehydration catalyst.

9. The method of dehydrating alcohols which comprises passing the alcohol and at least one substance selected from the group consisting of amines and imines, in vapor phase and at a temperature of between about 150° C. and 300° C. over a dehydration catalyst consisting of aluminum granules having on the surface thereof a partially reduced mixture of silicic and tungstic acids.

10. The method of dehydrating 2,3-butylene glycol which comprises passing a vaporous mixture of the glycol, approximately 20% by weight of water, approximately 10% by weight of methyl ethyl ketone and approximately 50% by weight of triethyl amine, all based on the weight of the glycol, in vapor phase and at a temperature of between about 150° C. and 300° C. over a dehydration catalyst.

WILLIAM J. HALE.
HARRY MILLER.